United States Patent Office 3,415,806
Patented Dec. 10, 1968

3,415,806
PERINONE PIGMENTS
Xaver Pfister, Riehen, Basel, and Karl Ulrich Steiner, Binningen, Basel-Land, Switzerland, assignors to Sandoz Ltd. (also known as Sandoz A.G.), Basel, Switzerland
No Drawing. Filed Mar. 7, 1966, Ser. No. 532,120
Claims priority, application Switzerland, Mar. 11, 1965, 3,422/65
6 Claims. (Cl. 260—157)

ABSTRACT OF THE DISCLOSURE

Perinone pigments, wherein two perinone dye radicals are bridged by an arylene amido function, are valuable for the mass coloration of plastics and synthetic fibers.

It has been found that perinone pigments of formula

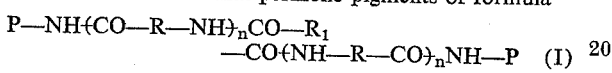
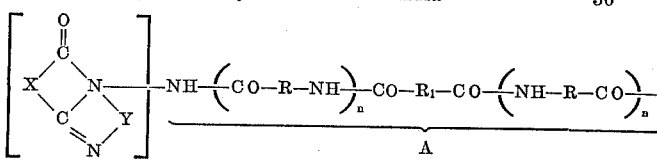

are valuable for the mass coloration of plastics and synthetic fibers.

In Formula I the two symbols P represent identical or different perinone dyes, R represents a phenylene radical which may be substituted by non-water-solubilizing groups, $R_1$ a hydrocarbon radical which may be substituted by non-water-solubilizing groups and may contain hetero atoms, and $n$ the figure 0 or 1.

Preferred perinone dyes have the formula

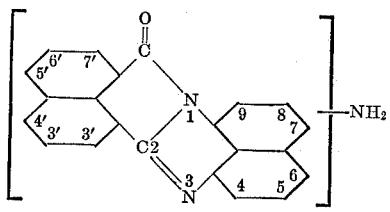

where X and Y represent identical or different phenylene or naphthalene radicals. The radical A may be bound to two radicals X, two radicals Y or to one radical X and one radical Y. With the exception of carboxylic and sulphonic acid groups, X and Y may bear various substituents, in particular low molecular alkyl or alkoxy or halogen, e.g. methyl, ethyl, methoxy, ethoxy, fluorine chlorine or bromine. $R_1$ stands preferably for phenylene or naphthalene which may be substituted, for example by halogen, alkyl or alkoxy groups, or for an aryl chain interrupted by carbon atoms or hetero atoms, e.g.

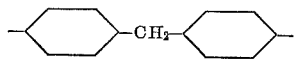

or

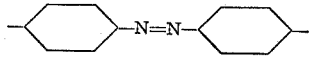

The new perinone pigments are obtained by reaction of 2 mols of an aminoperinone of formula $$P-NH-R_2 \qquad (III)$$

or of a mixture of aminoperinones of this formula, where $R_2$ represents a hydrogen atom or the radical $$-CO-R-NH_2 \qquad (IV)$$

with 1 mol of a dicarboxylic acid of formula $$HOOC-R_1-COOH \qquad (V)$$

or of one of its functional derivatives, e.g. its diester, anhydride or more particularly its dihalide.

The reaction is effected in the normal manner for the condensation of acid derivatives and amines. Aminoperinone and, for example, dicarboxylic acid dihalide are heated for a few hours, most advantageously at a temperature above 100° C., in an indifferent organic solvent, for example chlorobenzene, and in the presence of a basic condensing agent, for example an alkali carbonate. The aminoperinones used are known. They are preferably compounds of formulae

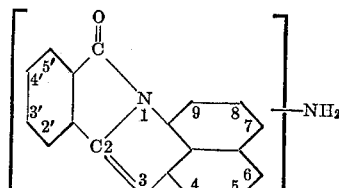

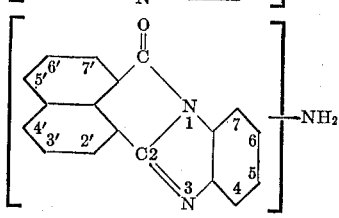

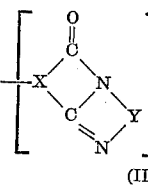

Of the aminoperinones of Formula VI, the 3'-aminoperinone or a mixture of 3'- and 4'-aminoperinones are used most often in the reaction; of the aminoperinones of Formula VII, 6-aminoperinone is preferred and of those of Formula VIII a mixture of 3'- and 6'-aminoperinones.

The resulting pigments are excellent for the mass pigmentation of plastics and natural or synthetic resins and their solutions. They are of special interest for pigmenting synthetic materials in the melt, for example polyamides. The polyamides thus pigmented may be polycondensates or polymers of dicarboxylic acids and diamides, e.g. of adipic acid and hexamethylene diamine, of lactams, e.g. ε-caprolactam, or of aminocarboxylic acids, e.g. ω-aminoundecanoic acid. After homogeneous mixing of the pigment in the polyamide melt the latter is processed by one of the normal methods, e.g. melt spinning, injection, extrusion or compression moulding. The pigments can also be used for the pigmentation of drying oils, surface coatings based on synthetic resins, rubber and paper, and for pigment prints on textiles or paper.

In the examples the parts and percentages are by weight and the temperatures in degrees centigrade.

Example 1

A mixture of 28 parts of 6-amino-1,2-naphthoylene-benzimidazol, 32 parts of 4-phthaloyliminobenzoyl chloride, 20 parts of water-free potassium carbonate and 1000 parts of chlorobenzene is heated at 120° for 16 hours. The water formed is distilled off. The obtained 45 parts of 6 - (4" - phthaloylimino-benzoylamino)-1,2-naphthoylene-benzimidazol are added to 1000 parts of pyridine and 20 parts of hydrazine hydrate and boiled for 2 hours. On dilution with water 20 parts of 6-(4"-aminobenzoylamino) - 1,2 - naphthoylene-benzimidazol are obtained. Alternatively this compound can be obtained by reacting 6 - amino - 1,2 - naphthoylene-benzimidazol with 4-nitrobenzoyl chloride and subsequently reducing the nitro group.

A mixture of 32 parts of the aforestated compound, 800 parts of chlorobenzene and 20 parts of potassium carbonate is heated at 120° and at this temperature a solution of 8.2 parts of terephthalic acid dichloride in 200 parts of chlorobenzene is added in the course of one hour. The water formed during the reaction is distilled off. After heating at 120° for 16 hours and subsequent filtration and washing, 33 parts of a yellow compound are obtained which has the formula

[structural formula]

A similar pigment is obtained when iso-phthalic acid dichloride is used for the reaction in place of terephthalic acid dichloride.

Example 2

A solution of 57 parts of 6-amino-1,2-naphthoylene-benzimidazol in 500 parts of water-free dichlorobenzene is heated at 150–160°. 20.5 parts of terephthalic acid dichloride are added in portions to the solution. A temperature of 150–160° is maintained until no further starting product is indicated. On isolation and drying approximately 65 parts of a yellow pigment are obtained. A similar pigment is formed when in place of terephthalic acid dichloride, iso-phthalic acid dichloride is reacted with the aminoperinone.

Example 3

57 parts of an aminoperinone of formula

[structural formula]

or of a mixture of the corresponding 3'- and 4'-aminoperinones are reacted with 20.5 parts of iso-terephthalic acid or terephthalic acid dichloride as described in Example 2. On isolation and drying 65 parts of a yellow pigment are obtained.

Example 4

57 parts of a mixture of the 3'- and 4'-aminoperinones used in Example 3 are heated in 1000 parts of water-free dichlorobenzene at 150–160° with stirring. 40 parts of 4-nitrobenzoyl chloride are added and stirring is continued at 150–160° until no further starting product is indicated, on which the condensation product is isolated.

The nitro group is reduced to the amino group in the known way, for example by catalysis using Raney nickel or NaHS.

80.8 parts of this amine in 500 parts of dichlorobenzene are heated at 150–160° with the gradual addition of 20.5 parts of terephthalic acid dichloride. This temperature is maintained with continued stirring unitl no further starting product is indicated, on which the product is isolated. About 85 parts of an orange pigment are obtained.

Example 5

62 parts of a mixture of aminoperinones of the formulae

[structural formula]

and

[structural formula]

are heated in 1000 parts of water-free dichlorobenzene at 150–160° and 40 parts of 4-nitrobenzoyl chloride are added. The further procedure follows that of Example 4 and yields approximately 90 parts of a red-violet pigment, the molecule of which consists of two aminoperinone radicals of Formula VIII bound in the 3'- or 6'-position through a chain of formula

-NH-CO-⟨⟩-NH-CO-⟨⟩-CO-NH-⟨⟩-CO-NH-

In place of terephthalic acid dichloride the equivalent amount of iso-phthalic acid dichloride may be used, in which case a pigment with similar propetries is obtained.

Example 6

27 parts of 4,4'-azobenzene-dicarboxylic acid are reacted with thionyl chloride in the known way to yield the acid chloride. This is added in small portions to a solution of 57 parts of 6-amino-1,2-naphthoylene-benzimidazol in 1000 parts of dichlorobenzene maintained at 150–160°. Stirring is continued at the same temperature until the starting product is no longer indicated. On isolation and drying about 80 parts of a yellow pigment are obtained which has the formula

[structural formula]

Example 7

Employing a procedure analogous to that of Example 2, 57 parts of 6-amino-1,2-naphthoylene-benzimidazol can be reacted with 50.6 parts of naphthalene-1,5-dicarboxylic acid chloride to yield a yellow pigment.

In place of naphthalene-1,5-dicarboxylic acid chloride, naphthalene 1,4-dicarboxylic acid chloride or naphthalene-2,6-dicarboxylic acid chloride can be used as reactant.

Example 8

A pigment of formula

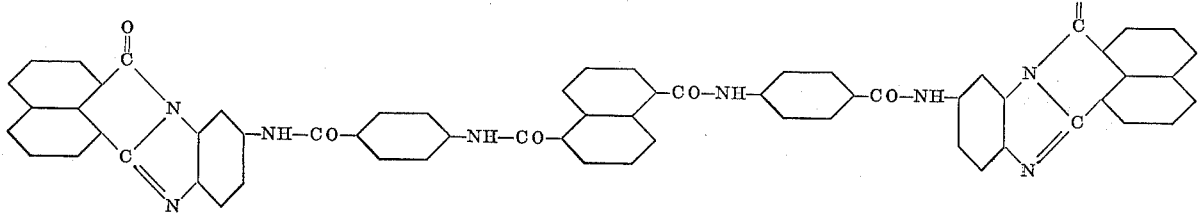

is obtained by a procedure analogous to that of Example 1 but employing in place of terephthalic acid dichloride an equimolar amount of naphthalene - 1,5 - dicarboxylic acid chloride.

Dyeing example 5 parts of the pigment obtained by the procedure of Example 1 are mixed with 1000 parts of poly-ε-caprolactam, which is subsequently melted at 285° under nitrogen and spun. A dyed filament very fast to light, rubbing, sublimation and wet treatments is obtained, which can be processed further by the norma methods.

Having thus disclosed the invention what we claim is:

1. A perinone pigment free from water-solubilizing groups and of the formula

P—NH(CO—R—NH)$_n$CO—R$_2$—CO
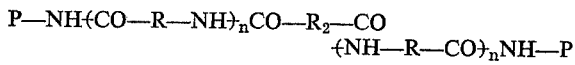
(NH—R—CO)$_n$NH—P wherein each P is, independently, a perinone dye radical an aromatic carbon of which is directly bound to the adjacent amido nitrogen;

R is a phenylene radical;

R$_1$ is selected from the group consisting of a phenylene, a naphthylene, a chain of two phenylenes interrupted by methylene and a chain of two phenylenes interrupted by azo; one aromatic carbon of which is directly bonded to one adjacent carbonyl group and another aromatic carbon of which is directly bonded to the other adjacent carbonyl group; and n is either 0 or 1.

2. A perinone pigment according to claim 1 wherein each P is, independently, of one of the formulae

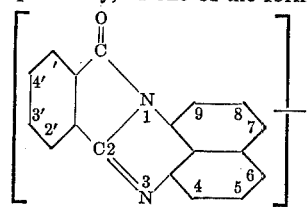

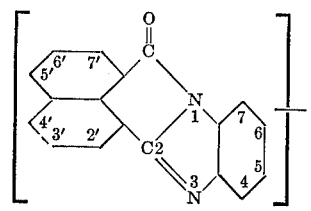

and

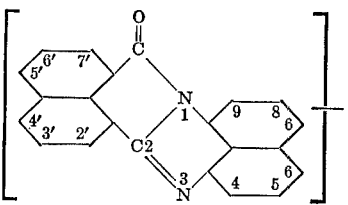

3. The perinone dye of the formula

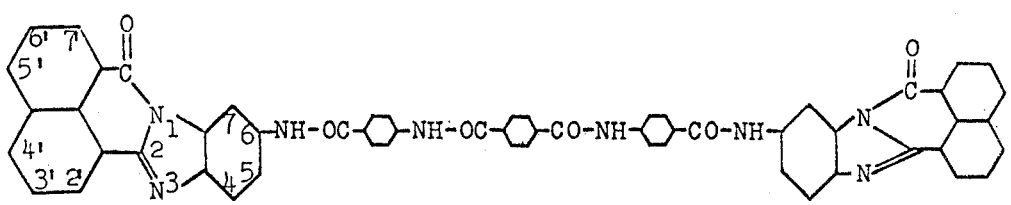

4. The perinone dye of the formula

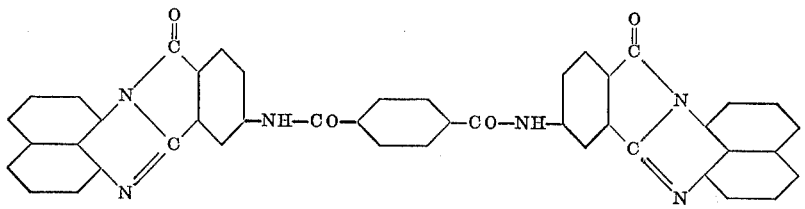

5. The perinone dye of the formula
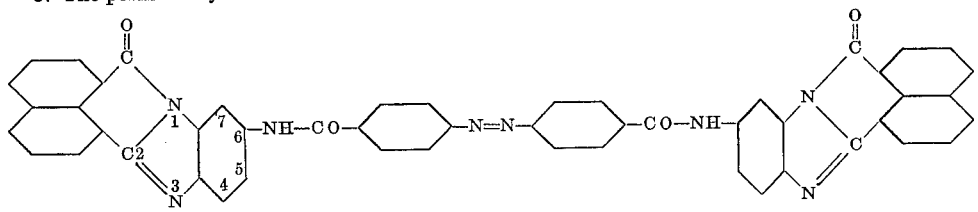
6. The perinone dye of the formula
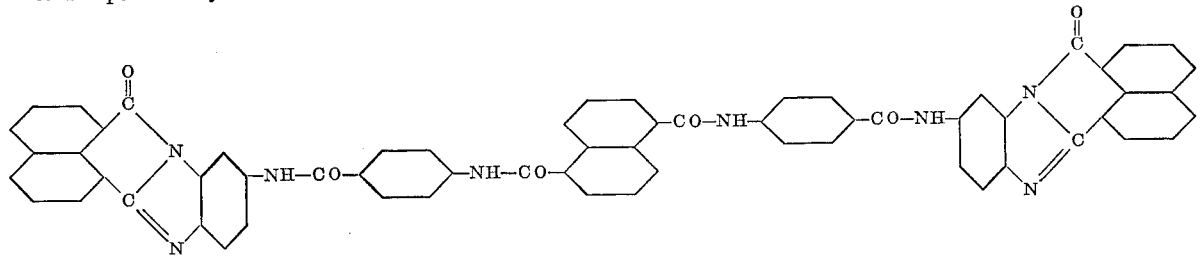
References Cited
UNITED STATES PATENTS
3,150,136  9/1964  Wolfrum et al. -- 260—309.2 XR
3,310,563  3/1967  Sieber et al. ---- 260—309.2 XR
FLOYD D. HIGEL, *Primary Examiner.*
U.S. Cl. X.R.
260—309.2, 152, 37, 764, 154, 256.4; 8—4, 41, 71; 106—208; 117—138.8, 154, 139

CERTIFICATE OF CORRECTION

Patent No. 3,415,806           Dated December 10, 1968

Inventor(s) Xaver Pfister and Karl Ulrich Steiner

It is certified that error appears in the above-identified patent and that said Letters Patent are hereby corrected as shown below:

Column 2, line 27, in formula (VIII), "3' 3'" should read --3' 2'--. Column 4, line 9, in the formula, "N$_2$H" should read --H$_2$N--. Column 5, line "norma" should read --normal--; line 41, in the formula of claim 1, "R$_2$" should read --R$_1$--. Column 6, line 5, the left nucleus of the first formula of claim 2 should read

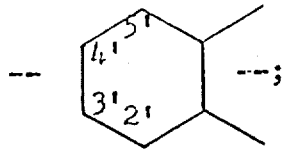

line 46, the upper right nucleus in the last formula of claim 2 should read

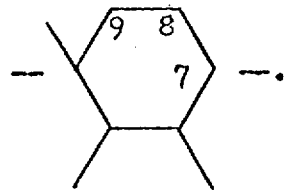

SIGNED AND
SEALED

MAR 3 - 1970

(SEAL)
Attest:

Edward M. Fletcher, Jr.
Attesting Officer

WILLIAM E. SCHUYLER, JR.
Commissioner of Patents